Mar. 3, 1925. 1,528,126
F. MÜLLER
MACHINE FOR AND METHOD OF SHAPING MILLING CUTTER BLANKS
Filed Aug. 1, 1921 4 Sheets-Sheet 1

Inventor
Friederich Müller
By Wayne B Wells
Attorney

Mar. 3, 1925.  1,528,126
F. MÜLLER
MACHINE FOR AND METHOD OF SHAPING MILLING CUTTER BLANKS
Filed Aug. 1, 1921  4 Sheets-Sheet 2

Patented Mar. 3, 1925.

1,528,126

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

MACHINE FOR AND METHOD OF SHAPING MILLING-CUTTER BLANKS.

Application filed August 1, 1921. Serial No. 488,941.

*To all whom it may concern:*

Be it known that I, FRIEDERICH MUELLER, a citizen of the United States, residing at Hartford, in the county of Hartford and State of Connecticut, have invented certain new and useful Improvements in Machines for and Methods of Shaping Milling-Cutter Blanks, of which the following is a specification.

My invention relates to machines for and methods of shaping milling-cutter blanks having helical teeth.

One object of my invention is to provide a machine for, and method of, shaping a milling-cutter blank, having teeth inclined relative to the axis thereof, to any predetermined contour adapted to cut either circular portions or circular portions combined with straight line portions by rotating a tool relatively to the blank in a plane parallel to the axis of the blank and by feeding the tool longitudinally of the blank.

Another object of my invention is to provide a machine for, and a method of, shaping a blank in the above indicated manner, varying the blank rotation to compensate for the inclination of the blank teeth, and relieving the teeth of the blank.

Another object of my invention is to provide a machine for, and a method of, shaping a milling-cutter blank by cutting the blank to a contour adapted to cut either a convex or concave circular portion while varying the blank rotation in accordance with the inclination of the teeth relative to the axis thereof and while effecting relieving movements of the cutting tool in conformity to the blank teeth.

A further object of my invention is to provide a machine that shall rotate a blank having teeth inclined relatively to the axis thereof, that shall rotate a cutting tool in a plane parallel to the axis of the blank while varying the blank rotation in accordance with the movement of the end of the cutting tool along the face of the blank, and that shall effect relieving movements of the cutting tool in timed relation to the blank rotation.

In a machine constructed in accordance with my invention and adapted to operate in accordance with my method, a blank having teeth inclined relatively to the axis thereof may be formed with a contour consisting in part of curved portions adapted to cut circular sections. The contour of the blank may be so formed as to cut either concave or convex portions combined with straight line portions. The straight line portions may be inclined at any desired angle relatively to the axis of the blank. The machine is provided with means for rotating a blank from any suitable source of power, the blank being provided with teeth inclined at any desired angle to the axis thereof. Two rotatable plates, which are preferably in the form of worm wheels, are operated in any suitable manner by means of the blank-rotating means. One of the rotatable plates, which serves to vary the rotation of the blank in accordance with the inclination of the blank teeth, is directly mounted on a carriage which is adapted to move longitudinally of the blank. The other rotatable plate, which carries the cutting tool, is rotatably mounted on a slide which in turn is mounted on the carriage. The slide is movable transversely of the blank for adjusting the cutting tool into operative relation to the blank. The cutting tool is so mounted on the plate supporting it that the end of the cutting tool may be adjusted to any desired distance on either side of the center of rotation of the plate. Thus, when the supporting plate is rotated by the blank-rotating means, the cutting point of the tool will move to cut either a concave or a convex contour on the face of the blank.

The plate, which varies the rotation of the blank, is provided with a slot extending through the center thereof and in which is mounted an adjustable block. The block is adjusted a distance from the center of the plate in accordance with the distance of the point of the cutting tool from the center of its supporting plate. The block operates a controlling slide in accordance with the movement of the point of the cutting tool along the blank. The controlling slide serves to vary the rotation of the blank in the manner set forth in my copending application Serial No. 286,524 filed March 31st, 1919.

In case it is desired to cut an inclined or a straight line portion on the blank, the two rotatable plates are disconnected from the blank-rotating means and the feeding means for the carriage is connected to such blank-rotating means. Accordingly the rotation of the cutting tool is stopped and such tool is fed longitudinally along the blank. The rotary or the longitudinal feeding movements of the cutting tool may be continuous or intermittent as desired. The blank rotation is varied during the longitudinal feeding movements of the tool in the manner disclosed in the above mentioned application Serial No. 286,524.

A relieving slide, which carries the tool supporting slide is reciprocated in timed relation to the blank rotation in order to effect relieving movements of the cutting tool. A cam member is geared to the blank-rotating means for effecting a reciprocatory movement of the relieving slide. The rotation of the milling-cutter blank is so varied as to maintain the relieving movements in conformity to the blank teeth.

Any suitable tool post may be provided for the cutting tool when cutting a blank adapted to cut either a convex circular shape or a straight line contour. However, in case of cutting a blank adapted to cut a concave circular shape, a modified tool post must be provided. Preferably, for such latter operations, the cutting tool is mounted in a support which is very similar to a boring bar.

Figure 1:
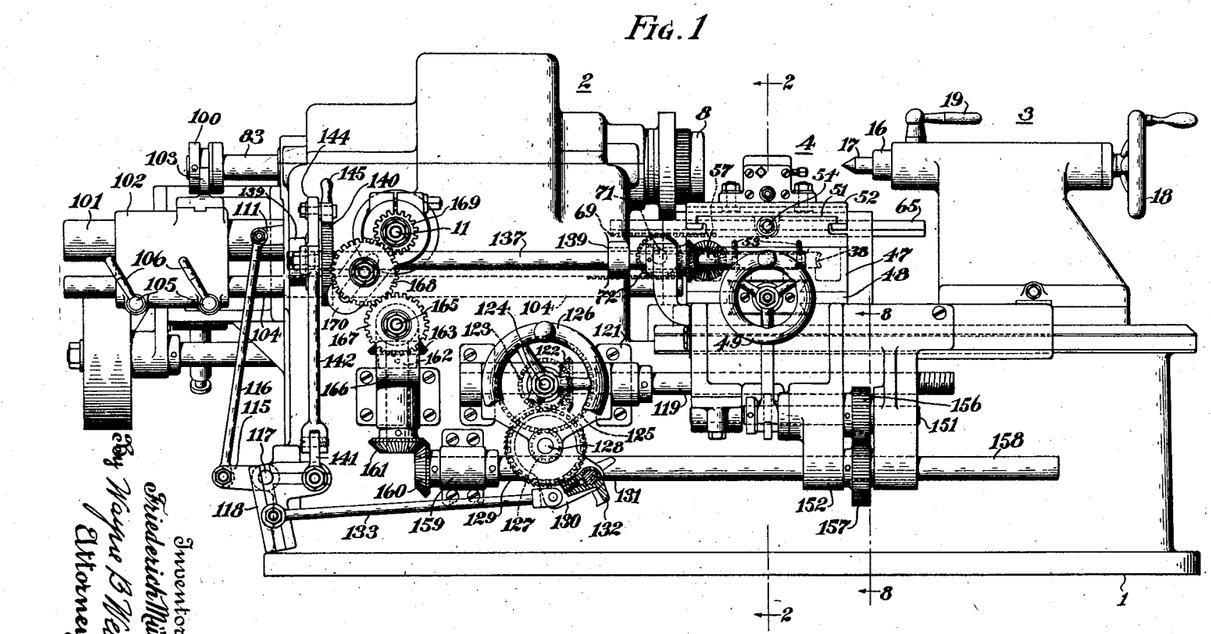
Figure 1 is a side elevational view of a machine constructed in accordance with my invention and adapted to practice my method.
Figure 2:
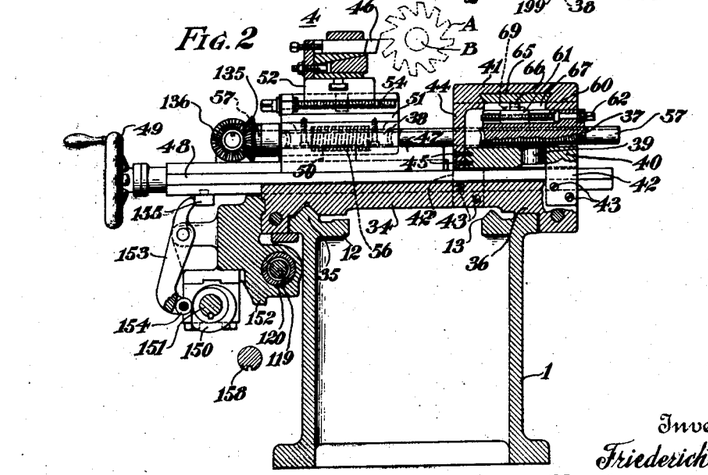
Fig. 2 is a section along the line 2—2 of the machine shown in Fig. 1.

Referring to Figs. 1 to 13, inclusive, of the drawings, a relieving machine, which is adapted to practice my methods, is shown provided with a main frame or bed 1 upon which the other parts of the machine are mounted. A headstock 2 and a tailstock 3 are provided for carrying the blank which is to be operated on. A tool holding and operating mechanism 4 is provided, as shown in Figs. 1 and 2, and preferably the headstock 2 and the tailstock 3 are so arranged as to hold the blank against longitudinal movement, the tool holding mechanism being moved longitudinally along the blank under certain conditions in a manner to be presently set forth. When the cutting tool is forming a contour on the blank adapted to cut either a concave or a convex surface, it is given a movement of rotation; and when cutting straight line surfaces on the blank, it is given a movement of translation longitudinally of the blank. When the machine is so constructed, the headstock 2 is fixedly secured to the bed, preferably being formed a part integral therewith, as shown. The tailstock 3 is adjustable along the bed to accommodate blanks or blank arbors of different lengths.

The headstock 2 is provided with a rotatable spindle 5 mounted in suitable bearings 6 and 7. Secured to the spindle 5 in any suitable manner is a collet chuck 8 which may be of any usual or preferred form and which is adapted to grip either the shank of the tool to be formed and relieved or an arbor upon which the tool is mounted. As illustrated, a blank A is mounted upon an arbor B, the arbor being engaged by the chuck 8. A driving mechanism including a a driving member in the form of a worm wheel 9, which meshes with a worm 10 on a transverse rotatable shaft 11, is provided for rotating the spindle 5.

The tailstock 3 may be of any usual or preferred construction and is adjustable along ways 12 and 13. The tailstock 3 may be secured in adjusted position by means of any suitable clamping means. A tailstock spindle 16, which carries a center member 17, can be moved longitudinally by means of a suitable screw member under the control of a hand wheel 18. A handle 19 is provided for clamping the spindle 16 in any adjusted position.

The transverse shaft 11, which rotates the spindle 5 by means of the worm member 10 and the worm wheel 9, carries a bevel gear wheel 20 near the end thereof. The bevel gear wheel 20 meshes with a bevel gear wheel 21 which is mounted on a longitudinal shaft 22. The longitudinal shaft 22 carries a plurality of differently diametered gear wheels 23 which are selectively connected to an elongated gear wheel 24. The gear wheel 24 is mounted on a longitudinal shaft 25. The shaft 25 carries a pinion 26 which meshes with a second pinion 27. The pinion 27 is mounted on a third longitudinal shaft 28. The shaft 28, near the opposite end thereof, carries a pulley 29 which is connected by a belt (not shown) to any suitable source of power. The elongated gear wheel 24, which is fixedly secured to the shaft 25, is surrounded by a sleeve member 30. The sleeve member 30 is open at the forward upper side and a bushing 31 is rotatably mounted on such sleeve member. The bushing 31 is provided with projecting lugs between which a gear wheel 32 is rotatably mounted. The gear wheel 32 meshes with the gear wheel 24 on the shaft 25 and is selectively moved into mesh with the differently diametered gear wheels 23. The bushing 31 can be moved angularly and longitudinally on the sleeve 30 so as to bring the gear teeth 32 into mesh with any one of the differently diametered gear wheels 23. A spring-pressed plunger 33, which is carried by the bushing 31, is adapted to enter any one of a series of apertures in the sleeve 30 so as to hold the gear wheel 32 in proper position to mesh with any desired one of the gear wheels 23. It will be seen that by this construction, the shaft 22 together with the shaft 11 can be driven from the shaft 28 at any one of a series of speeds.

Referring particularly to Figs. 1 to 13, inclusive, the means for effecting intermittent rotary or longitudinal feeding movements of the cutting tool will be described. A carriage 34, which is movable along ways 35 and 36, carries two rotatable plates 37 and 38. The plates are preferably in the form of worm gear wheels. The plate 37 is provided with a hub portion 39 which extends into a supporting plate 40. The supporting plate 40 is carried by a bridge member 41 which is mounted upon the carriage 34. The bridge member 41 is provided with four projecting arms 42 which are secured to the carriage 34 by means of screws 43. The supporting plate 40 is not only secured to the projecting arms 42 by means of screws but is also secured to an arm 44 by means of screws 45. The rotatable plate 37 serves to vary the rotation of the blank A in a manner to be hereinafter set forth to compensate for the inclination of the teeth on the blank.

The rotatable plate 38, which carries a cutting tool 46, is rotatably mounted on a transversely movable slide 47. The slide 47 is mounted on a relieving slide 48 which is carried by the carriage 34. The slide 47 is controlled by a hand wheel 49 and a screw member (not shown) for adjusting the cutting tool 46 into operative relation to the blank A. The top portion of the relieving slide 48 is cut away back of the slide 47 so as not to interfere with the bridge member 41 and the supporting plate 40. The rotatable plate 38 is provided with a hub portion 50 which extends into the slide 47. A support 51 for a tool slide 52 is secured to the rotatable plate 38 in any suitable manner, as by means of screws 53. The tool slide 52 carries the cutting tool 46 and is adjusted in any suitable manner as by means of a screw member 54. The tool post shown in Fig. 2 of the drawings is particularly adapted for supporting a cutting tool to shape a blank adapted to cut a convex contour. Such tool post may be of any well known construction.

Two worm members 55 and 56 are slidably mounted on, and keyed to rotate with, a shaft 57. The shaft 57 is provided with bearings in the bridge member 41 and the carriage 34. The worm members 55 and 56 respectively mesh with the teeth on the plates 37 and 38 which are constructed in the form of worm wheels. The worm member 56 is partially enclosed by the slide 47 and is compelled to follow the movements of such slide. The worm member 55 may be held in mesh with the teeth on the plate 37 in any suitable manner by means of the bridge member 41. The shaft 57 is rotated in a manner to be hereinafter set forth for effecting movement of rotation of the plates 37 and 38 when convex or concave circular cutting portions are to be cut on the blank.

The supporting plate 37 is provided with a centrally located groove 60 within which is slidably mounted a block member 61. A screw member 62, which is mounted on the plate 37, engages the block member 61 for moving such block member to any set position. The top portion of the bridge member 41 carries a control slide 65 which is adapted for movement longitudinally of the blank. A pin 66 projects from the block 61 into a transverse slot 67 which is formed in the control slide 65. By means of the pin and slot connection between the slide 65 and block 61, the slide 65 is compelled to effect a movement of translation during the rotary movement of the plate 37. The extent of movement of the slide 65 during rotation of the plate varies in accordance with the distance the pin 66 is set from the center of rotation of the plate 37. The slide 65 is provided with a series of rack teeth 69 which mesh with a pinion 70 mounted on a shaft 71. The shaft 71 carries a second pinion 72 which meshes with rack teeth formed on a bar 104. The bar 104 varies the rotation of the blank A in a manner to be hereinafter set forth.

As heretofore stated, the machine is adapted for cutting blanks having helical teeth. In order that blanks with such teeth may be properly relieved, it is necessary to effect the relieving movements of the tool in particular relation to the rotative movements of the blank so that the relief may be in conformity with the helical teeth. I have stated that the relieving movements of the tool are effected in timed relation to the rotative movements of the blank; and, for any given position of the carriage this timed relation is fixed and definite, but when the carriage is moved to bring the tool into a new cutting position, it is necessary to vary the relation between the relieving movements of the tool and the rotative movement of the blank. For this purpose I make use of a mechanism which is in many respects similar to that set forth in my copending application Serial No. 201,338, filed November 10th, 1917, and disclosed in my copending application Serial No. 286,524 above referred to. In the present construction the rotative movement of the blank is varied in preference to varying the relieving movements of the tool. While I prefer to change the blank rotation, as disclosed in my Patent No. 1,429,617, dated Sept. 19, 1922, it will be understood that my present invention in its broader aspects can also be applied to change the relieving movements as in my Patent No. 1,429,611, dated Sept. 19, 1922.

In the construction illustrated, the driving member or worm wheel 9 is not connected directly to the spindle 5 but is connected indirectly by means of suitable gearing 78 which can be supplementally moved to change the spindle rotation. By preference, this gearing is bodily rotatable and includes a rack and pinion, the rack being longitudinally slidable in accordance with the longitudinal movements of the cutting end of the tool. A sleeve 79 is coaxially mounted with the spindle 5 and is supported by bearings 80 and 81 in the headstock. The inner end of the sleeve 79 preferably extends into and has a bearing in the outer end of the spindle 5. A frame 82 is recessed to receive the outer end of the spindle 5 and to engage the outer surface thereof. The aforesaid worm wheel 9 is rigidly secured to the sleeve 79. A shaft 83 having rack teeth formed thereon at 84 is slidably mounted in the sleeve 79. The shaft 83 is splined to the sleeve 79 so as to be rotatable therewith. A transverse shaft 85, having teeth 86 formed thereon, is rotatably mounted in bearings in the frame 82. The teeth 86 mesh with the rack teeth 84. A transverse shaft 87 is also rotatably mounted in the frame 82. The two shafts 85 and 87 are connected by spur gear wheels 88 and 89. A third rotatable shaft 90 is rotatably mounted in the frame 82. A worm 91, which meshes with worm teeth 92 formed in the periphery of the spindle 5 near the end thereof, is secured to the shaft 90. A gearing is provided at the side of the bracket 82 opposite from the gears 88 and 89 for connecting the shafts 87 and 90. A gear wheel 93 is mounted on the shaft 87, and a gear wheel 94 is mounted on the shaft 90. An adjustable slotted bracket 95 is mounted on the frame 82 and this carries adjustable bearing studs 96 and 97 on which are mounted, respectively, idler gear wheels 98 and 99.

An annularly grooved collar 100 is carried by the shaft 83 near the outer end thereof. A longitudinal guide stud 101 is rigidly secured to the main frame 1 adjacent the shaft 83. A bracket 102, having a fork 103 entering the groove in the collar 100, is slidably mounted on the stud 101. The bracket 102 is apertured to receive a longitudinal rod 104, which is connected at its right-hand end with the carriage and the gear wheel 72. The bracket 102 may be clamped to the rod 104 in any desired relative position and preferably by means of screws 105, 105 provided with handles 106.

It will be seen that, when either the carriage 34 is moved longitudinally along the bed or the plates 37 and 38 are rotated, the rod 104, together with the bracket 102, will be moved at the same time. By reason of the engagement of the fork 103 with the collar 100 the shaft 83 is similarly moved, thus moving the rack teeth 84. When the rack slides longitudinally, the shaft 85 is turned and this serves, by means of the gearing and the several shafts that have been described, to turn the worm 91. The rotative movement of the worm 91 serves to turn the spindle 5 relatively to the frame 82 and the sleeve 79. It will be understood, as before stated, that the entire gearing 78 rotates bodily with the spindle 79. It will therefore be clear that the relative movement of the spindle 5 with respect to the sleeve 79 simply serves to either increase or decrease the spindle rotation to a certain extent. However, the relative movement of the spindle 5 is determined by the longitudinal movement of the rack 84, which in turn is determined either by the longitudinal movement of the carriage 34 and of the cutting tool 46 carried thereby or by the rotation of the gear wheel 72. Inasmuch as the relieving cam to be described, reciprocates the tool with a frequency which is normally uniform, and inasmuch as the spindle 5 and the blank are given a changed rotation which is in exact proportion to the longitudinal movement of the carriage and the tool, it is clear that the relieving movements are effected in such relation to the blank as to be in conformity with helical teeth.

The amount of variation of the spindle 5 and blank rotation can be changed in accordance with the degree of inclination of the helical teeth by removing one or the other or both of the gear wheels 93 and 94 and substituting other gear wheels of different diameters. The idler gear wheels 98 and 99 can be properly adjusted to mesh with such differently diametered gear wheels. It is also possible to cause the relative movements of the spindle 5 to take place in either direction in conformity with helical teeth inclined in either direction. As illustrated, the machine is adjusted for cutting teeth with left-hand helices. For cutting teeth with right-hand helices the idler gear wheel 98 is removed and the gear wheel 99 is adjusted to mesh directly with the gear wheels 93 and 94. When it is desired to cut a blank with straight teeth instead of helical teeth, the gearing is rendered ineffective, as for instance, by loosening the clamping screws 105, thus permitting the rod 104 to slide freely through the bracket 102. By loosening the clamping screws 105 it is possible to preliminarily adjust the carriage without affecting the position of the spindle 5 and blank. When the cutter and the blank have been properly adjusted relatively, the handles 106 are turned to connect the carriage with the mechanism for controlling the spindle rotation.

From the foregoing description, it will be observed that in following helical teeth as described, the blank is rotated in each instance through a little more or a little less than one revolution, as required for right-hand or left-hand helices. It will later be noted that during each rotation of the spindle 5 and blank a whole number of relieving movements are effected.

In Figs. 1, 2, 6 and 13 of the drawings, means is illustrated for either feeding the cutting tool 46 intermittently along the blank A or for intermittently effecting a rotary movement of the cutting tool for forming a blank adapted to cut curved surfaces. A cam member 110 is mounted on the sleeve 79 for effecting intermittent movement of the cutting tool. The sleeve 79, as heretofore set forth, is rotated by means of the worm wheel 9 and the shaft 11. A bell-crank lever 111, which is mounted on a shaft 112, carries a roller 113 on one arm thereof. The roller 113 operates in a cam groove 114 formed in the cam member 110. The opposite arm of the lever 111 projects through the casing of the headstock and is connected to a crank arm 115 by means of a link 16. The arm 115 is fixedly mounted upon a short shaft 117 which carries a bell-crank lever 118. The shaft 117 is provided with any suitable bearing on the frame 1 of the machine. The bell-crank lever 118 is fixedly mounted on the shaft 117 and is adapted to control not only the intermittent linear feeding movement of the cutting tool but also to control the intermittent rotative feeding movement of the cutting tool. A spring member 109 is provided for acting on the lever 118 in opposition to the cam member 110.

The longitudinal feeding movement of the carriage 34 and of the cutting tool is effected by a feed shaft 119. Such feed shaft engages a nut 120 on the carriage for effecting intermittent movement of the carriage. The feed shaft 119 is provided with bearings 121 and carries a bevel pinion 122. The bevel pinion 122 meshes with a second bevel pinion 123 which is mounted on a shaft 124. The shaft 124 is supported in any suitable manner by a bracket projecting from the frame 1 of the machine. The shaft 124 carries a gear wheel 125 and a hand wheel 126. The hand wheel 126 serves to effect feeding of the carriage at will. The gear wheel 125 meshes with a pinion 127 which is mounted on a shaft 128. The shaft 128 is provided with any suitable bearing in the frame of the machine and carries a ratchet wheel 129. A swinging arm 130 is loosely mounted on the shaft 128 and carries a pin 131 which supports a pawl 132. The pawl 132 is adapted to engage the teeth of the ratchet wheel 129. A link 133 is provided for adjustably connecting the swinging arm 130 to one arm of the bell-crank lever 118. The arm of the bell-crank lever 118 is provided with a T-slot in which is secured a bolt that is attached to the link 133. From the above construction, it is apparent the rotative movement of the spindle and of the cam member 110 causes an oscillating movement from the bell-crank lever 111 and also of the bell-crank lever 118. The bell-crank lever 118 and the pawl 132 operate the ratchet wheel 129 to effect intermittent rotative movement of the feed shaft 119. The feed shaft is connected and disconnected from the source of power by means of the pawl 132.

The shaft 57 which rotates the plates 37 and 38 carries a bevel gear wheel 135 near the end thereof. The bevel gear wheel 135 meshes with a second bevel gear wheel 136 which is mounted on a shaft 137. The bevel gear wheel 136 is slidably mounted on the shaft 137 but keyed thereto in order to rotate therewith. A bracket 138, which projects from the carriage 34, is provided for holding the bevel gear wheels 135 and 136 in mesh with each other. The shaft 137 is provided with suitable bearings 139 projecting from the side of the frame 1 and carries a ratchet wheel 140 which is operated by the bell-crank lever 118.

The arm of the bell-crank lever 118 opposite to the one which is connected to the lever 133 is provided with a T-shaped slot in which is adjustably mounted a suitable bolt. The bolt is connected to a link 141. The link 141 is pivotally connected to a rod 142. The rod 142 is connected to a swivel member 143 which is mounted on a bell-crank lever 144. The bell-crank lever 144 is mounted on the shaft 137 and carries a pawl 145 which engages the teeth of the ratchet wheel 140. When the pawl 145 is in engagement with the teeth of the ratchet wheel 140, it is apparent the rotation of the cam member 110 causes intermittent operation of the shaft 137 and of the two plates 37 and 38. The plate 38, as heretofore set forth, operates the cutting tool for forming the blank to cut either a concave or a convex surface. The plate 37 serves to operate the rod 104 for varying the blank rotation to compensate for the helical teeth.

In order to effect relieving movements of the cutting tool, the relieving slide 48 is reciprocated by means of a cam member 150. The cam member 150 is mounted on a shaft 151 which is carried by an apron 152 attached to the carriage 34. The cam member operates a lever 153 which is pivotally mounted upon the apron 152. One end of the lever 153 carries a roller 154 which engages the cam member and the other end of the lever engages a lug 155 which projects from the slide 48. Any suitable spring member may be provided for holding the slide 48 in engagement with the lever 153. The shaft 151 carries a gear wheel 156 which meshes with a second gear wheel 157 which is mounted on a longitudinal shaft 158. The gear wheel 157 is slidably mounted on the shaft 158 but is keyed thereto in order to be rotated therewith. The shaft 158 is provided with a bearing 159 on the frame 1 near one end thereof and with bearings in the apron 152 of the carriage. The shaft 158 carries a bevel pinion 160 which meshes with a bevel pinion 161. The bevel pinion 161 is mounted on a short shaft 162 which has a bearing on the side of the frame 1. The shaft 162 carries a second bevel pinion 163 which meshes with another bevel pinion 164. The bevel pinion 164 is mounted on a shaft 165 which is supported by a bracket 166. The shaft 165 is connected to the power shaft 11 by means of gear wheels 167, 168 and 169. The gear wheels 167, 168 and 169 may be changed in any well known manner to vary the relieving movements of the cutting tool relatively to the rotation of the blank. The gear wheels 167 and 169 are respectively mounted on the shafts 165 and 11 and the idler gear wheel 168 is mounted on an arm 170 which is carried by a hub on the main frame.

Figure 14:
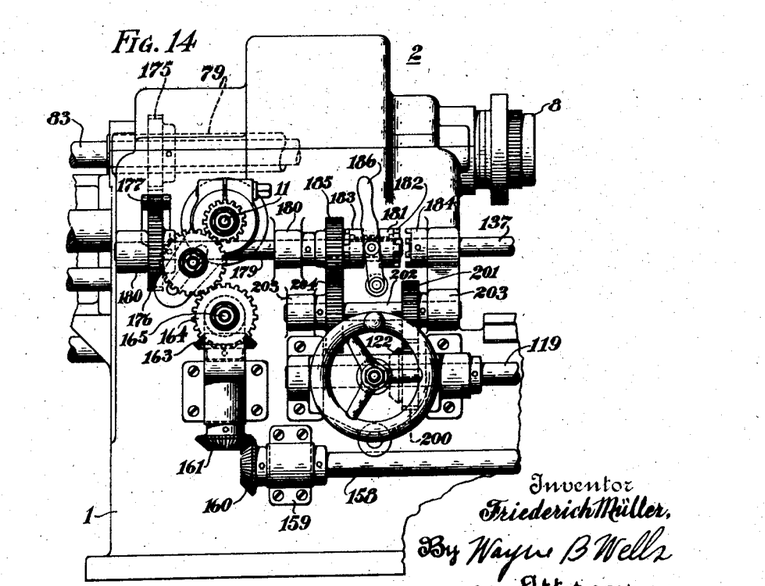
Fig. 14 is a partial side elevational view of a machine for effecting continuous feeding movement of the cutting tool.

Referring to Fig. 14, a modification is illustrated wherein either the carriage 34 may be fed continuously or the cutting tool may be given a continuous movement of rotation. The machine for effecting continuous movement of the cutting tool is similar in construction to the machine for intermittently operating the cutting tool with the exceptions that the feeding connections to the power shaft are changed. In the modification shown in Fig. 14 similar parts to those shown in the machine illustrated in Fig. 1 will be referred to by like reference characters. A gear wheel 175 is fixedly mounted on the sleeve 79 in order to be operated by the worm wheel 9 and the power shaft 11. The gear wheel 175 is connected to a gear wheel 176 by means of an idler gear wheel 177. The gear wheel 177 is suitably mounted on the frame of the machine. The gear wheel 176 is mounted on a shaft 179 which is provided with bearings 180 on the side of the main frame 1. The shaft 179 carries a clutch member 181 which is slidably mounted thereon but which is adapted to rotate therewith. The clutch member 181 carries two sets of teeth 182 and 183 which are respectively adapted to engage similar sets of teeth formed on a collar 184 and on the side of a gear wheel 185. A pivotally mounted lever 186 is provided with a pin which enters a groove formed in the clutch member 181 for moving such clutch member.

The collar 184 is fixedly mounted on the shaft 137 which rotates the two plates 37 and 38. Thus, when the lever 186 is so moved as to mesh the clutch teeth 182 with the teeth formed on the collar 184, the shaft 137 is connected to the worm wheel 9 for giving the plates 37 and 38 a continuous movement of rotation.

The feed shaft 119 for the carriage 34 is provided with a gear wheel 200 which is mounted adjacent to the bevel pinion 122. The gear wheel 200 meshes with a gear wheel 201 which is mounted on a short shaft 202. The shaft 202 is provided with bearings 203 and carries a second gear wheel 204 which meshes with the gear wheel 185. Thus when the lever 186 is moved to mesh the clutch teeth 183 with the clutch teeth formed on the gear wheel 185, the feed shaft 119 is connected to the power shaft 11 for continuously feeding the carriage 34.

Figures 3, 4, 5:
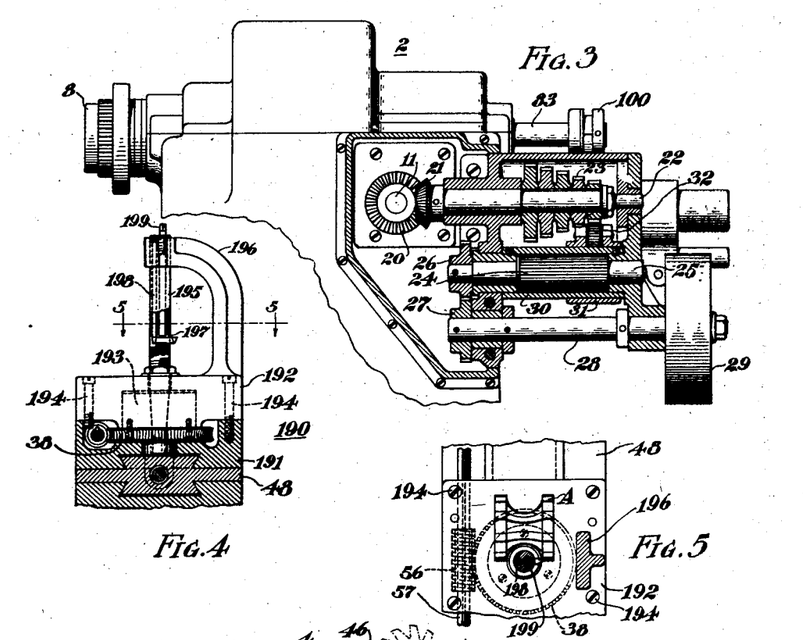
Fig. 3 is a rear view, partially in section, of the machine shown in Fig. 1.
Figs. 4 and 5 are detail views illustrating the mounting of the cutting tool for cutting a blank adapted to cut a concave circular shape.
Figures 6, 8, 9, 10, 11, 12:
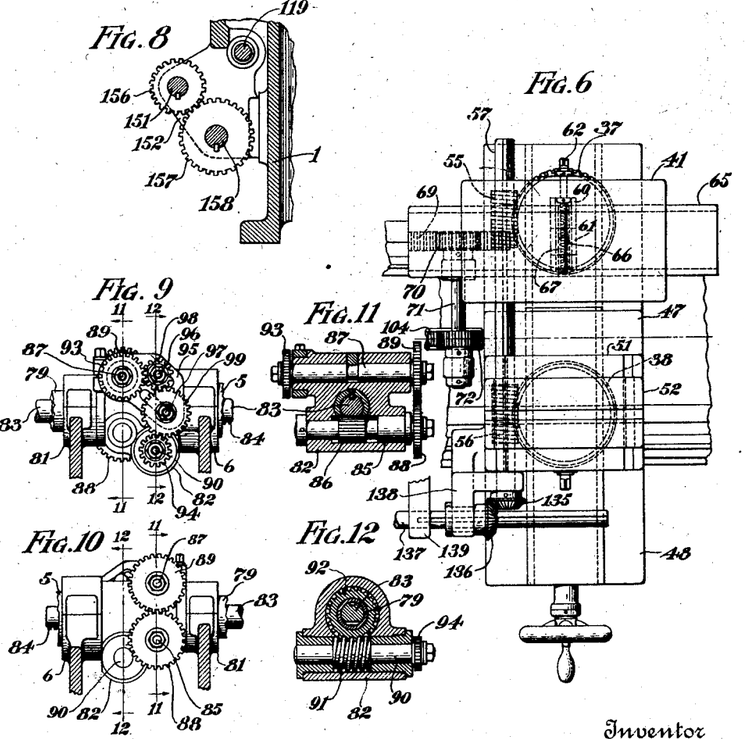
Fig. 6 is a plan view of the two rotatable plates.
Fig. 8 is a sectional view along the line 8—8 of the machine shown in Fig. 1.
Figs. 9 and 10 are detailed views of the mechanism adapted to vary the movement of the blank-carrying spindle, the views being taken from opposite sides of the machine.
Fig. 11 is a transverse sectional view taken along the lines 11—11 of Figs. 9 and 10.
Fig. 12 is a fragmentary transverse sectional view taken along the lines 12—12 of Fig. 10.
Figure 7:
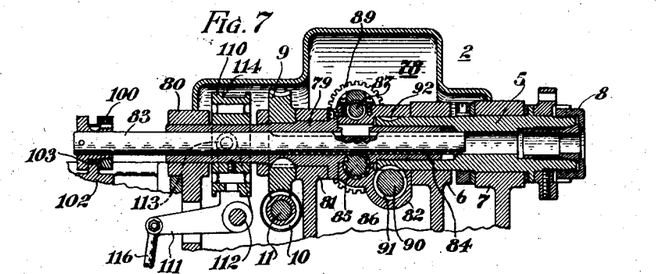
Fig. 7 is a sectional view of the headstock of the machine shown in Fig. 1.
Figure 13:
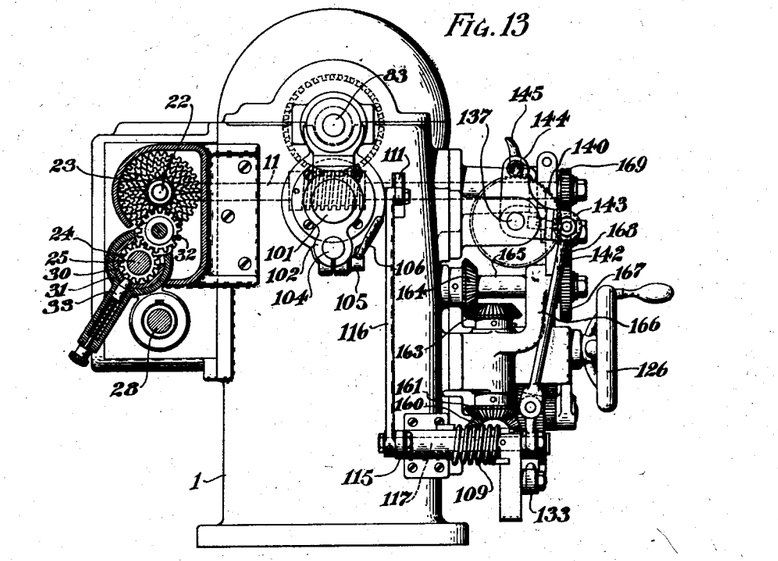
Fig. 13 is an end view of the machine shown in Fig. 1.

Referring to Figs. 4 and 5, a modified tool post is illustrated which is preferable for supporting the tool when forming a blank adapted to cut a concave surface. In the modification shown in Figs. 4 and 5, the slide 47 shown in Figs. 1 and 2 is replaced by a slide 190. The slide 190 comprises a lower portion 191 which is mounted on the relieving slide 48 and a top portion 192. The lower portion 191 rotatably supports the plate 38. A cylindrical block 193, which is mounted on and connected to the plate 38, is located within a recess formed in the top portion 192 of the slide 190. The top portion 192 of the slide is preferably connected to the lower portion 191 by means of suitable screws 194. A boring bar 195 projects through the top portion 192 of the slide and is mounted in the cylindrical block 193. The outer end of such boring bar is supported by means of an arm 196 which projects from the slide 190.

The boring bar 195 is provided with a transverse opening 197 within which a cutting tool is mounted. Two longitudinal holes are drilled in the bar 195 for carrying two rods 198 and 199. The rod 199 is threadedly connected near the outer end thereof to the boring bar 195 and serves to hold the cutting tool in any set position. The rod 198 is also threadedly connected near the upper end thereof to the boring bar 195. The lower end of the rod 198 is tapered and engages a tapered section of the cutting tool. The adjustment of the rod 198 serves to adjust the cutting tool to any set position.

In a machine constructed as above set forth, a blank may be formed with a curved contour adapted to cut either convex or concave circular surfaces and also if so desired may be formed to cut straight surfaces combined with such curved surfaces. The cutting tool is adjusted on the plate 38 a distance from the center of rotation of the plate according to the diameter of the curved surface desired to be cut by the finished blank. The cutting end of the tool is adjusted on one side or the other of the center of the plate 38 according to whether it is desired to cut a convex or a concave surface by the finished blank. The tool post shown in Fig. 2 is preferable for cutting convex surfaces on the blank and also for cutting straight surfaces.

The tool post shown in Figs. 4 and 5 is provided for cutting concave surfaces on the blank. The axis of the boring bar 195 coincides with the center of rotation of the plate 38. The cutting tool, as heretofore set forth, is adjusted by means of the rod 198 to cut concave surfaces on the blank.

The block 61 which is carried by the plate 37 is adjusted a distance from the center of rotation of the plate 37 in accordance to the diameter of the curved surface to be cut by the finished blank. Such block serves to vary the blank rotation in order that the relieving movements may be effected in correct relation to the blank teeth.

It will be understood that such changes and modifications may be made in my invention as fall within the limits of the appended claims.

What I claim is:

1. In a machine for cutting a blank to a predetermined contour, the combination with a rotary blank carrying spindle and a cutting tool, of means for automatically giving said tool a movement of rotation in timed relation to the blank rotation to cut convex and concave surfaces on the blank and for automatically giving the tool a rectilinear movement to cut straight portions on the blank.

2. In a metal-cutting machine, the combination with a rotary blank-carrying spindle and a cutting tool, of means for giving said tool a movement of rotation in timed relation to the blank rotation, and means for compensating the spindle rotation in accordance with the longitudinal movement of the cutting tool along the face of the blank.

3. In a metal-cutting machine for operating on a blank, the combination with means for rotating the blank, a cutting tool, and means operated by said blank-rotating means for rotating said tool, of means for varying the blank rotation in accordance with the longitudinal movement of the end of the tool along the face of the blank.

4. In a metal-cutting machine, the combination with a rotary blank-carrying spindle, a carriage movable longitudinally of said spindle, a transversely movable slide mounted on said carriage, and a cutting tool carried by said slide, of means for automatically giving said tool a movement of rotation in timed relation to the spindle rotation, and means for varying the blank rotation in accordance with the longitudinal movement of the point of the tool along the blank.

5. In a machine for cutting a blank to a predetermined contour, the combination with a rotary blank-carrying spindle, and a rotatable cutting tool, of means for automatically giving said tool a movement of rotation in timed relation to the blank rotation in a plane parallel to the axis of the blank to cut convex and concave surfaces on the blank.

6. In a metal-cutting machine for operating on a blank having helical teeth, the combination with means for rotating the blank, a cutting tool for engaging the blank, and means operated by the blank-rotating means for giving the tool a movement of rotation to cut a curved surface on the blank, of means for varying the relation between the blank and the tool during the above cutting operation in accordance with the helical teeth on the blank.

7. In a metal-cutting machine for operating on a blank having teeth inclined relative to the axis thereof, the combination with means for rotating the blank, a cutting tool for engaging the blank, and means for giving the cutting tool a feeding movement of rotation in a plane parallel to the axis of the blank and in timed relation to the blank rotation, of means for varying the blank rotation in accordance with the inclination of the blank teeth during the feeding movement of the tool.

8. In a metal-cutting machine for operating on a blank having teeth inclined relative to the axis thereof, the combination with means for rotating the blank, a cutting tool for engaging the blank, and means operated by said blank-rotating means for feeding the tool longitudinally of the blank and for giving the tool a movement of rotation, of means for compensating the rotation of the blank in accordance with the inclination of the blank teeth when the tool is given a movement of rotation and when the tool is moved longitudinally of the blank.

9. In a metal-cutting machine for operating on a blank having teeth inclined relative to the axis thereof, the combination with means for rotating the blank, a carriage, a cutting tool, and a rotatable support mounted on said carriage for said tool, of means for automatically giving said tool support a movement of rotation in timed relation to the blank rotation when cutting a curved surface of the blank, means for varying the blank rotation in accordance with the inclination of the blank teeth, and means for automatically feeding said carriage longitudinally of the blank when cutting a straight line section on the blank.

10. In a metal-cutting machine for operating on a blank having helical teeth, the combination with means for rotating the blank, a carriage movable longitudinally of the blank, a cutting tool, a rotatable plate mounted on said carrige for supporting said tool, and a second rotatable plate mounted on said carriage adjacent to the tool-supporting plate, of means for rotating said plates by said blank-rotating means, and means operated by the second rotatable plate for varying the blank rotation to compensate for the helical teeth.

11. In a metal-cutting machine for operating on a blank having teeth inclined relative to the axis thereof, the combination with means for rotating the blank, a carriage, means for moving the carriage longitudinally of the blank, a cutting tool for engaging the blank, a rotatable plate mounted on said carriage for supporting the cutting tool, a second plate rotatably mounted on the carriage adjacent to the tool-supporting plate, and means comprising a shaft mounted on the carriage and rotated by the blank-rotating means for rotating said plates, of means operated by the second rotatable plate for varying the rotation of the blank in accordance with the longitudinal movement of the cutting end of the tool, and means for automatically varying the blank rotation in accordance with the longitudinal movement of the carriage.

12. In a machine tool for operating on a blank having teeth inclined relative to the axis thereof, the combination with means for rotating the blank, a carriage movable longitudinally of the blank, a transversely movable slide mounted on said carriage, two rotatable plates, one of said plates being mounted on said slide, and means for rotating said plates by said blank-rotating means, of a cutting tool mounted on one of said plates for engaging the blank, and means operated by the second plate for varying the rotation of the blank to compensate for the inclination of the blank teeth when the tool-carrying plate is given a movement of rotation.

13. In a machine tool for operating on a blank having teeth inclined relative to the axis thereof, the combination with means for rotating the blank, a carriage, means for moving the carriage longitudinally of the blank, a transversely movable slide mounted on said carriage, and two rotatable plates, one of said plates being mounted on said slide, of means for rotating the plates by the blank-rotating means, a cutting tool mounted on one of said plates, means operated by the other plate for varying the blank rotation in accordance with the inclination of the blank teeth when the tool is given a movement of rotation, and means for automatically varying the blank rotation in accordance with the longitudinal movement of the carriage.

14. In a machine tool for operating on a blank, the combination comprising means for rotating the blank, a plate rotated by said blank-rotating means, and means operated by the rotation of the plate for automatically varying the rotation of the blank.

15. In a machine tool for operating on a blank, the combination with means for rotating the blank, a carriage movable longitudinally of the blank, and a rotatable plate mounted on said carriage, of means automatically controlled by said plate for varying the rotation of the blank.

16. In a machine tool for operating on a blank, the combination comprising means for rotating the blank, a plate rotated by said blank-rotating means, a block slidably mounted in a slot formed in said plate, means for adjusting said block to any set position, a control slide operated by said block when the plate is rotated, and means operated by said control slide for varying the rotation of the blank.

17. In a machine tool for operating on a blank, the combination comprising means for rotating the blank, a cutting tool adapted to engage the blank, an adjustable block associated with said tool, means operated by said blank-rotating means for giving the tool and said block a movement of rotation, and means operated by said block for varying the rotation of said blank.

18. In a machine tool for operating on a blank, the combination comprising means for rotating the blank, a cutting tool adapted to engage the blank, an adjustable block associated with said tool, means for giving said tool and the block a movement of rotation in synchronism, and means operated by said block for varying the rotation of the blank.

19. In a machine tool for operating on a blank, the combination comprising means for rotating the blank, two plates, a cutting tool and an adjustable block respectively mounted on said plates, means for rotating the two plates in synchronism, and means operated by said block for varying the rotation of the blank.

20. In a machine tool for operating on a blank, the combination comprising means for rotating the blank, two plates, a cutting tool and an adjustable block respectively mounted on said plates, means for rotating the two plates in synchronism, a control slide operated by said block when said plates are rotating, and means operated by the control slide for varying the rotation of the blank.

21. In a machine tool for shaping a blank having teeth inclined relative to the axis thereof to cut a curved surface, the combination with means for rotating the blank, a carriage movable longitudinally of the blank, a transversely movable slide mounted on said carriage, and two rotatable plates, one of said plates being mounted on said slide, of a cutting tool for engaging the blank and mounted on the plate carried by said slide, means for adjusting the position of the tool on the plate in accordance with the curve desired to be cut by the finished blank, means for rotating said plates by said blank-rotating means, a block carried by the second plate, and means controlled by said block for varying the blank rotation to compensate for the inclination of the blank teeth.

22. In a machine tool for shaping a blank having helical teeth to cut a circular curve, the combination with means for rotating the blank, a transversely movable slide mounted on said carriage, two rotatable plates, one of said plates being mounted on said slide, and means operated by said blank-rotating means for rotating said plates, of a cutting tool mounted on the plate carried by said slide, means for adjusting the tool on the plate in accordance with the radius of the curve desired to be cut by the finished blank, means for adjusting the slide to position the tool in engagement with the blank, a block carried by the second plate, means for adjusting the position of said block on the plate, and means operated by said block for varying the blank rotation to compensate for the helical teeth.

23. In a machine tool for shaping a blank to cut any desired circular curve, the combination with means for rotating the blank, a carriage movable longitudinally of the blank, a transversely movable slide mounted on the carriage, and two rotatable plates, one of said plates being mounted on the carriage and the other of said plates being mounted on said slide, of a cutting tool mounted on one of said plates, a block slidably mounted in a slot formed in the other one of said plates, means for adjusting the block relative to the center of the plate carrying it, a control slide operated by the block during the rotation of said plates, and means operated by said control slide for varying the rotation of the blank.

24. In a metal-cutting machine for operating on a blank having helical teeth, the combination with means for rotating the blank, a cutting tool for engaging the blank, means operated by the blank-rotating means for giving the tool a movement of rotation to cut a curved surface on the blank, and means for effecting relieving movements between the tool and the blank in timed relation to the blank rotation, of means for varying the relation between the blank and the tool during the above cutting operation in accordance with the helical teeth on the blank.

25. In a metal-cutting machine for operating on a blank having teeth inclined relative to the axis thereof, the combination with means for rotating the blank, a cutting tool for engaging the blank, and means operated by the blank-rotating means for continuously feeding the tool longitudinally of the blank, of means for varying the blank rotation during such feeding movement in accordance with the inclination of the blank teeth, and means for effecting relieving movements of the tool in timed relation to the blank rotation.

26. In a metal-cutting machine for operating on a blank having teeth inclined relative to the axis thereof, the combination with means for rotating the blank, a cutting tool for engaging the blank, and means for giving the cutting tool a feeding movement of rotation in a plane parallel to the axis of the blank and in timed relation to the blank rotation, of means for varying the blank rotation in accordance with the inclination of the blank teeth during the feeding movement of the tool, and means operated by the blank-rotating means for effecting relieving movements of the tool in timed relation to the blank rotation.

27. In a metal-cutting machine for operating on a blank having teeth inclined relative to the axis thereof, the combination with means for rotating the blank, a cutting tool for engaging the blank, and means operated by said blank-rotating means for feeding the tool longitudinally of the blank and for giving the tool a movement of rotation, of means for compensating the rotation of the blank in accordance with the inclination of the blank teeth when the tool is given a movement of rotation, and when the tool is moved longitudinally of the blank, and means for effecting relieving movements of the tool in timed relation to the blank rotation.

28. In a metal-cutting machine for operating on a blank having helical teeth, the combination with means for rotating the blank, a carriage, a cutting tool, and a rotatable support for said tool mounted on said carriage, of means for automatically giving said tool support a movement of rotation in timed relation to the blank rotation when cutting a curved surface on the blank, means for automatically feeding said carriage longitudinally of the blank when cutting a straight line section on the blank, and means operated by the blank-rotating means for effecting relieving movements between the blank and the tool in timed relation to the blank rotation.

29. In a metal-cutting machine for operating on a blank having helical teeth, the combination with means for rotating the blank, a carriage movable longitudinally of the blank, a cutting tool, a rotatable plate mounted on said carriage for supporting said tool, and a second rotatable plate mounted on the carriage adjacent to the tool-supporting plate, of means for rotating said plates by the blank-rotating means, means operated by the second rotatable plate for varying the blank rotation to compensate for the helical teeth, and means for effecting relieving movements of the cutting tool in timed relation to the blank rotation.

30. In a metal-cutting machine for operating on a blank having teeth inclined relative to the axis thereof, the combination with means for rotating the blank, a carriage, means for moving the carriage longitudinally of the blank, a cutting tool for engaging the blank, a rotatable plate mounted on said carriage for supporting the cutting tool, a second plate rotatably mounted on the carriage adjacent to the tool-supporting plate, and means comprising a shaft mounted on the carriage for rotating said plates in timed relation to the blank rotation, of means operated by the second rotatable plate for varying the rotation of the blank in accordance with the longitudinal movement of the cutting end of the tool, means for operating the tool-supporting plate to effect relieving movements of the tool in timed relation to the blank rotation, and means for automatically varying the blank rotation in accordance with the longitudinal movement of the carriage.

31. In a machine tool for operating on a blank having teeth inclined relative to the axis thereof, the combination with means for rotating the blank, a carriage, means for moving the carriage longitudinally of the blank, a transversely movable slide mounted on said carriage, and two rotatable plates, one of said plates being mounted on said slide, of means for rotating the plates by the blank-rotating means, a cutting tool mounted on one of said plates, means operated by the other plate for varying the blank rotation in accordance with the inclination of the blank teeth when the tool is given a movement of rotation, means for operating said slide by said blank-rotating means to effect relieving movements between the tool and the blank in timed relation to the blank rotation, and means for automatically varying the blank rotation in accordance with the longitudinal movement of the carriage.

32. In a machine tool for operating on a blank, the combination comprising means for rotating the blank, a cutting tool adapted to engage the blank, an adjustable block associated with said tool, means operated by said blank-rotating means for giving the tool and said block a movement of rotation, means operated by said block for varying the rotation of said blank, and means for effecting relieving movements of the tool in timed relation with the blank rotation.

33. In a machine tool for operating on a blank having teeth inclined relative to the axis thereof, the combination comprising means for rotating the blank, a cutting tool adapted to engage the blank, an adjustable block associated with said tool, means for giving said tool and the block a movement of rotation in synchronism, means for effecting relieving movements of the tool relative to the blank, and means operated by said block for varying the rotation of the blank in accordance with the inclination of the blank teeth.

34. In a machine tool for shaping a blank having teeth inclined relative to the axis thereof to cut a curved surface, the combination with means for rotating the blank, a carriage movable longitudinally of the blank, a transversely movable slide mounted on said carriage, and two rotatable plates, one of said plates being mounted on said slide, of a cutting tool for engaging the blank and mounted on the plate carried by said slide, means for adjusting the position of the tool and the plate in accordance with the curve desired to be cut by the finished blank, means for rotating said plates by the blank-rotating means, means for effecting relieving movements of said tool in timed relation to the blank rotation, a block carried by the second plate, and means controlled by said block for varying the blank rotation to compensate for the inclination of the blank teeth.

35. In a machine tool for operating on a blank, the combination with means for rotating the blank, a rotatable bar, means operated by said blank-rotating means for giving said bar a movement of rotation, and a cutting tool extending through said bar transversely to the axis thereof, of a rod extending axially into said bar for holding the tool in any set position, and a second rod extending axially into said bar for adjusting the tool to any set position.

36. In a machine tool for operating on a blank, the combination with means for rotating the blank, a rotatable plate, and means operated by the blank-rotating means for giving said plate a movement of rotation, of a bar mounted on said plate, a cutting tool extending through said bar transversely to the axis thereof, a rod extending axially into said bar for holding the tool in any set position, and a second rod extending axially into said bar for adjusting the tool to any set position.

37. In a machine tool for operating on a blank having teeth inclined relative to the axis thereof, the combination with means for rotating the blank, a rotatable plate, and means for giving said plate a movement of rotation in timed relation to the blank rotation, of a bar mounted on said plate, a cutting tool extending through said bar transversely to the axis thereof, a rod extending longitudinally into said bar for holding the tool in any set position, a second rod extending longitudinally into said bar for adjusting the tool to a set position, and means for effecting relieving movements of the tool in timed relation to the blank rotation.

38. In a machine tool for operating on a blank, the combination with means for rotating the blank, a rotatable bar, means operated by the blank-rotating means for giving said bar a movement of rotation, and a cutting tool extending through said bar transversely to the axis thereof, of a rod extending axially into said bar for holding the tool in any set position, a second rod extending axially into said bar for adjusting the tool to any set position, means for varying the blank rotation in accordance with the movement of the end of the cutting tool along the face of the blank during rotation of said bar, and means for effecting relieving movements of the cutting tool in timed relation to the blank rotation.

39. In a machine tool for operating on a blank having helical teeth, the combination with means for rotating the blank, a rotatable bar, means operated by the blank-rotating means for giving said bar a movement of rotation, and a cutting tool extending through said bar transversely to the axis thereof, of a rod extending axially into said bar for holding the tool in any set position, a second rod extending axially into said bar for adjusting the tool to any set position, means comprising a member rotating in synchronism with the cutting tool for varying the blank rotation to compensate for the helical teeth on the blank, and means for effecting relieving movements of the tool in timed relation to the blank rotation.

40. The method of forming a blank having teeth inclined relatively to the axis thereof which consists in rotating the blank, in providing a cutting tool in operative relation to the blank, in continuously feeding the tool longitudinally of the blank, in varying the blank rotation in accordance with the feeding movement of the tool.

41. The method of forming a blank having teeth inclined relatively to the axis thereof, which consists in rotating the blank, in providing a plate for supporting the cutting tool in operative relation to the blank, in rotating the supporting plate, and in selectively varying the position of the tool on the plate to form convex and concave surfaces on the blank.

42. The method of forming a blank having teeth inclined relative to the axis thereof, which consists in rotating the blank, in providing a plate for supporting the cutting tool in operative relation to the blank, in continuously feeding the tool longitudinally along the blank, in rotating the supporting plate and in selectively varying the position of the tool on the plate to form convex and concave surfaces on the blank.

43. The method of forming a blank having teeth inclined relatively to the axis thereof which consists in rotating the blank, in providing a cutting tool in operative relation to the blank, in continuously feeding the tool longitudinally of the blank, in varying the blank rotation in accordance with the feeding movement of the tool, and in effecting relieving movements of the tool in timed relation to the blank rotation.

44. The method of forming a blank having teeth inclined relatively to the axis thereof, which consists in rotating the blank, in providing a cutting tool in operative relation to the blank, in rotating the cutting tool in a plane parallel to the axis of the blank, and in varying the blank rotation in accordance with the movement of the end of the tool along the blank.

45. The method of forming a blank having teeth inclined relatively to the axis thereof, which consists in rotating the blank, in providing a cutting tool in operative relation to the blank, in rotating the cutting tool in a plane parallel to the axis of the blank, in varying the blank rotation in accordance with the movement of the end of the tool along the blank, and in effecting relieving movements of the cutting tool.

46. The method of forming a blank having helical teeth, which consists in rotating the blank, in providing a cutting tool in operative relation to the blank, in feeding the tool longitudinally of the blank to cut straight portions on the blank, in varying the blank rotation in accordance with such longitudinal movement, in rotating the cutting tool in a plane parallel to the axis of the blank, and in varying the blank rotation in accordance with longitudinal movements of the point of the cutting tool along the blank.

47. The method of forming a blank having helical teeth, which consists in rotating the blank, in providing a cutting tool in operative relation to the blank, in feeding the tool longitudinally of the blank to cut straight portions on the blank, in varying the blank rotation in accordance with such longitudinal movement, in rotating the cutting tool in a plane parallel to the axis of the blank, in varying the blank rotation in accordance with longitudinal movement of the point of the cutting tool along the blank, and in effecting relieving movements of the cutting tool during the longitudinal feeding movement and during the rotary feeding movement.

In testimony whereof, I hereto affix my signature.

FRIEDERICH MÜLLER.